April 27, 1965      F. W. LOCKE      3,180,194
PAPERBOARD SLOTTING DEVICE
Filed Oct. 9, 1961      2 Sheets-Sheet 1

INVENTOR
FRANK W. LOCKE
BY Robert M. Dunning
ATTORNEY

April 27, 1965
F. W. LOCKE
3,180,194
PAPERBOARD SLOTTING DEVICE
Filed Oct. 9, 1961
2 Sheets-Sheet 2
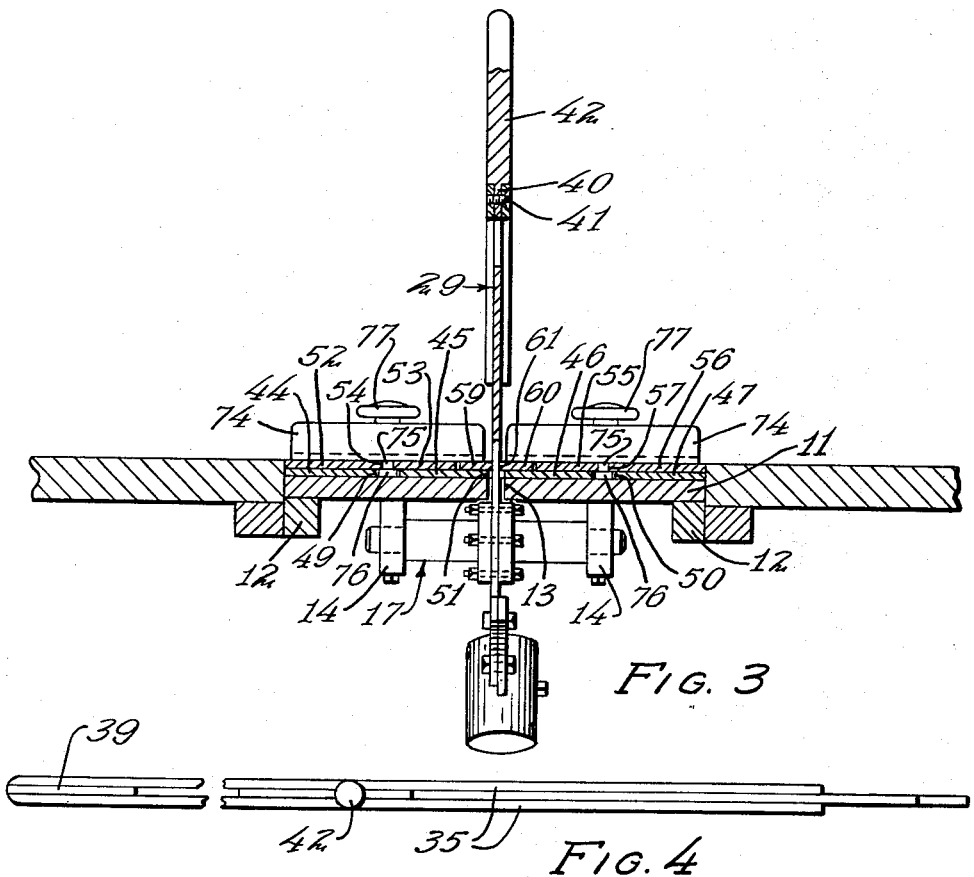
FIG. 3
FIG. 4
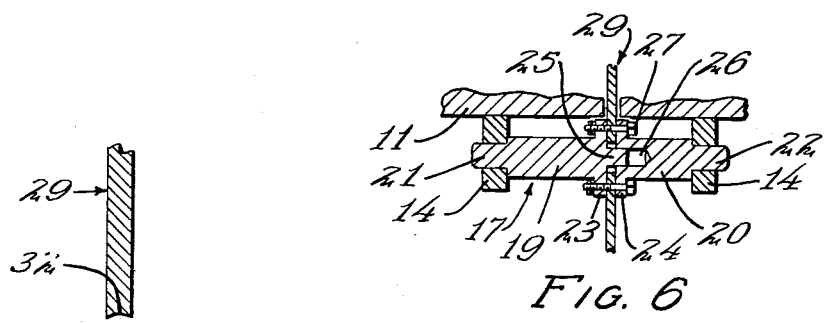
FIG. 5
FIG. 6
INVENTOR
FRANK W. LOCKE
BY *[signature]*
ATTORNEY 3,180,194
PAPERBOARD SLOTTING DEVICE
Frank W. Locke, Minneapolis, Minn., assignor to Waldorf Paper Products Company, a corporation of Minnesota
Filed Oct. 9, 1961, Ser. No. 143,710
1 Claim. (Cl. 83—373)

This invention relates to an improvement in paperboard slotting devices and deals particularly with a device for use in hand slotting corrugated containers and the like.

In producing hand made samples of corrugated containers it is usual practice to crease the blank in one direction to define the upper and lower edges of the walls of the container, and then to crease the blank in a right angular direction to define the wall panels of the container. The edges of the blank are then notched along opposite edges of the blank to separate these edges into end closing flaps. This notching is usually accomplished by a pivoted guillotine blade which is pivotal into a slot on the table. Obviously, the use of the slotter is merely typical of one use thereof. One of the difficulties experienced with these devices is that in order to be practical for slotting containers of ordinary size, the length of the blade is fairly limited. Furthermore, the cutting blades are normally mounted in a frame which is pivotally connected to the upper surface of the table so that the length of the slot is definitely limited. It is evident that larger containers could be slotted through the use of a longer blade, but such a device is disadvantageous and more difficult to operate on containers of ordinary sizes. It is a purpose of the present invention to provide a hand slotter capable of forming slots of any length without increasing the length of the blade.

A feature of the present invention resides in the provision of a slotter having a blade which is of a thickness to fit snugly within the slot and which extends through the slot for pivotal attachment to the table beneath the surface thereof. One end of the blade is pivotally connected to the table, and the other end of the blade is shaped to extend above the upper surface of the table in one pivotal position thereof and to extend beneath the surface of the table in another pivotal position thereof. The cutting edge of the blade is capable of cutting a slot in paperboard placed on the surface of the table which is of fixed maximum depth. However, by raising the blade and pushing the blank so that the slot which has been formed straddles the portion of the blade extending to the table, the blade can be lowered to cut another notch of the same maximum length in alignment with the first notch. This operation can be continued to form a slot of any desired length.

A further feature of the preferred form of construction of the invention lies in the formation of a slot through the use of a blade which is so shaped as to first penetrate the paperboard at the base of the slot, and to progressively cut the slot toward the outer end of the slot. In this way, a very effective clean slot may be formed.

These and other objects and novel features of the present invention will be more clearly and fully set forth in the following specification and claims.

FIGURE 3 is a vertical sectional view through the apparatus, the position of the section being indicated by the line 3—3 of FIGURE 1.

FIGURE 4 is a top plan view of the blade and handle.

FIGURE 5 is a vertical sectional view through a portion of the cutting edge of the blade.

FIGURE 6 is a sectional view through the pivotal connection between the blade and the table.

Figure 2:
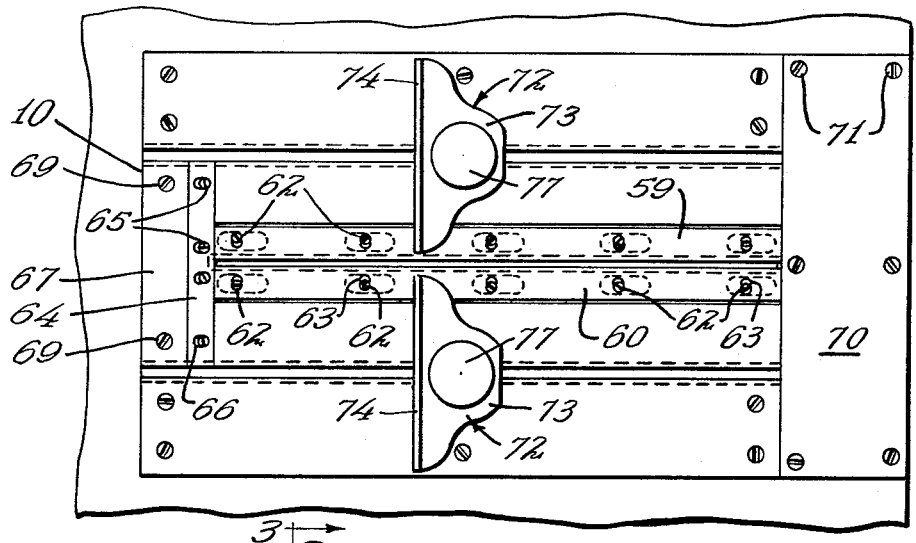
FIGURE 2 is a top plan view of the table for the slotter, the blade having been removed to illustrate the construction thereof.

In the particular arrangement illustrated in the drawings, the hand slotter A is mounted in a notch 10 in a work table B. This arrangement is employed in order to provide a large supporting area for corrugated sheets and the like. Obviously, the slotter A could be mounted on any sort of a supporting stand.

In the arrangement illustrated, the slotter includes a generally rectangular base plate 11 which is supported by a frame 12 encircling three sides of the notch 12. As indicated in FIGURES 3 and 6 of the drawings, the base plate 11 is provided with an elongated slot or aperture 13 extending therethrough parallel to the sides of the base plate. A pair of ears 14 are secured to the under surface of the base plate 11 on opposite sides of the slot 13. These ears 14 are bolted or otherwise secured in place as indicated at 15, and support aligned bearing sleeves 16. The ears 14 support a pivot which is indicated in general by the numeral 17.

With reference to FIGURE 6 of the drawings, it will be noted that the pivot 17 comprised a pair of short shafts 19 and 20 having reduced diameter end portions 22 at one end thereof and having peripheral flanges 23 and 24 at the other ends thereof. An axial projection 25 is provided on the shaft 19 which extends into a socket 26 in the end of the shaft 20. The two flanges 23 and 24 may be clamped together by clamping bolts 27, these bolts 27 also extending through the slotting blade 29.

Figure 1:
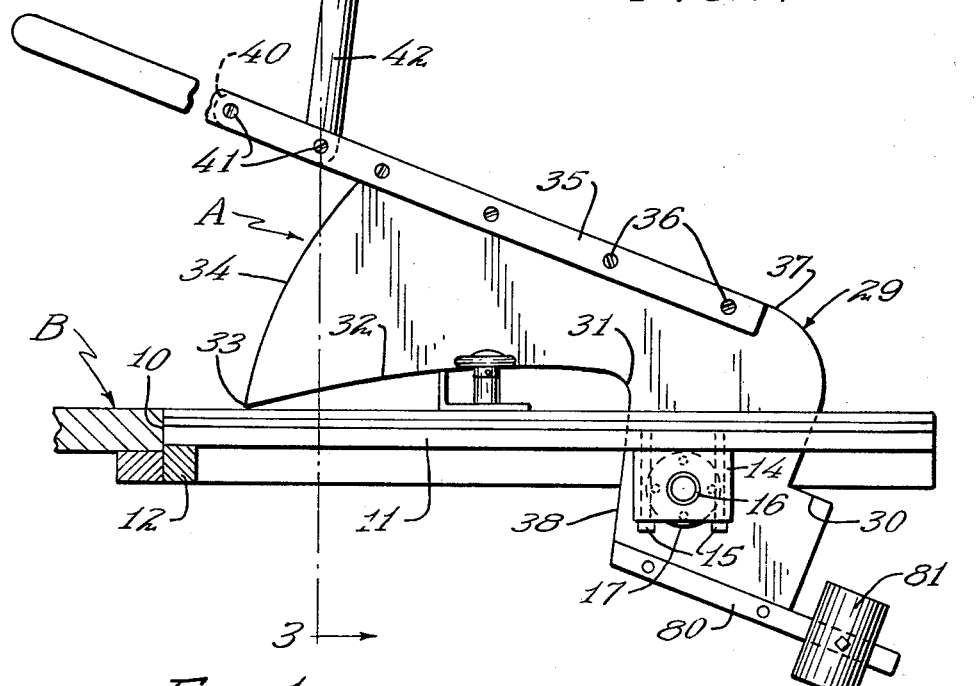
FIGURE 1 is a side elevational view of the hand slotter, the supporting structure being fragmentarily illustrated.

The blade 29 is preferably shaped as is best illustrated in FIGURE 1 of the drawings. The blade is formed of a generally rectangular steel plate having a short projection 30 at one end which is designed to abut against the under surface of the plate 11 in one extreme position of the blade. A generally triangular notch 31 is provided in the under surface of the blade providing a slightly curved cutting edge 32 and an angularly extending edge 38. The forward end of the cutting edge 32 converges to a point 33 which is designed to first penetrate the paperboard at the base of the slot. The forward edge 34 of the blade 29 is preferably arcuate, with the axis of the pivot 17 forming the center of arcuation.

The shape of the cutting edge 33 is such that the pointed end 33 first penetrates the paperboard and the blade progressively penetrates the paper as the blade is lowered, the portion of the blade passing the plane of the upper surface of the table from the point toward the other end of the cutting blade. As a result, the blade is arranged to cut a slot from the base of the slot to the edge of the board. As indicated in FIGURE 5 of the drawings, the blade 29 is preferably provided with a hollow ground edge.

A pair of handle blades 35 are bolted or otherwise secured at 36 to the upper edge 37 of the blade 29 to project beyond the end 34 thereof. An inner handle member 39 extends between the bars 35 as indicated in FIGURE 4. An L-shaped bar 40 is interposed between the straps 35 and is held in place by bolts 41 or other suitable means. The upwardly projecting end of the L-shaped member 40 is generally round in cross section to provide an upwardly projecting handle 42. The upwardly projecting handle 42 is provided so that the knife blade can be pivoted by an operator standing rearwardly of the blade. This arrangement permits the slots to be inserted into the edge of the paperboard from the pivoted end of the blade in the event the blank being slotted is sufficiently large to make it difficult for the operator to reach the forwardly projecting handle.

Four elongated strips 44, 45, 46 and 47 are secured to the upper surface of the base plate 11, these plates being anchored in spaced relation. The plates 44 and 45 are spaced to provide a groove 49 therebetween, and the plates 46 and 47 are similarly spaced to provide a groove 50 therebetween. The strips 45 and 46 are spaced apart to provide a groove 51 which is aligned with the slots 13 so that the blade 29 may pass therebetween.

A pair of plates 52 and 53 overlie the plates 44 and 45 respectively and are spaced to provide a groove 54 therebetween which is above the groove 49 and is substantially narrower than the groove 49. The combined grooves 54 and 49 form in effect a T-shaped slot for a purpose which will be later described. A pair of plates 55 and 56 overlie the plates 46 and 47 respectively and are spaced to provide a slot 57 therebetween which is in registry with the slot 50 and which is substantially narrower than the slot 50. The slots 57 and 50 combine to form a T-shaped slot similar to that previously described.

A pair of plates 59 and 60 overlie the plates 45 and 46 and are spaced to provide a slot 61 therebetween. As indicated in FIGURE 2 of the drawings, the plates 59 and 60 are held in position by counter-sunk bolts 62 which are engaged in recessed slots 63 in the plates 59 and 60. As a result, the plates or strips 59 and 60 are adjustably supported from movement toward and away from one another. The plates 59 and 60 are spaced apart a distance proper to snugly fit the sides of the blade 29, and the paperboard is cut between the plates 59 and 60 and the edges of the blade 29.

The plates 59 and 60 define the side edges of the slot, and these plates are longitudinally adjustable relative to the base plate and the overlying plate 45 and 46. A transversely extending plate 64 is secured overlying the strips 45 and 46, and the center of this plate forms the end of the cutting slot. The plate 64 is held in place by bolts 65 which are mounted in slots 66 extending transversely of the plate 64, or longitudinally of the slot. A fixed transverse plate 67 is also secured overlying the plates 45 and 46 by machine screws 69. A transverse plate 70 forms the other end of the slot and is held in place overlying the plates 44, 45, 46 and 47 by machine screws 71.

The purpose of all of the various plates is to provide a slot which is slightly adjustable in width and length so as to snugly accommodate the blade. Obviously, except for the adjustable plates 59, 60 and 64, the table formed could be cast in one piece if preferred.

Means are provided for holding the sheet to be slotted in right angular relation to the slot. The means comprises a pair of angle members 72 having horizontal flanges which are slidable upon the surface of the table, and vertical flanges 74 which provide abutments against which the sheet may engage. The under surface of the flanges 73 are provided with guide bars 75 which are in right angular relation to the vertical flanges 74 and which are snugly engaged in the slots formed between the plates 52 and 53 and between the plates 55 and 56. Nuts 76 are slidable in the wider grooves between the plates 44 and 45 and the plates 46 and 47. Hand wheels 77 have a threaded shank which extends through the flanges 73 and into the nuts 76, the threaded shank not being visible in the drawings. By rotating the hand wheels, the abutment forming members 72 may be held in an adjusted position. By unthreading the hand wheels, the member 72 may be removed from the table.

An arm 80 is secured to the lower rear end of the blade 29 and supports a counter weight 81 which acts to normally hold the blade 29 in a raised position. As a result, the sheets being slotted may be inserted beneath the blade into proper position over the slot, and the blade may then be lowered to cut the slots, the pointed end 33 first penetrating the paperboard at the base of the slot, and the blade cutting the paperboard with a shearing action to the edge of the sheet.

One of the important features of the invention lies in the fact that the slotter is capable of cutting slots longer than the cutting edge of the blade. To do this, the sheet is positioned beneath the blade, and the blade is pivoted to cut a slot of desired length. The abutment forming member 72 may then be removed and the sheet may be moved inwardly or rearwardly, the slot embracing the portion of the blade extending through the slot. As the slotted sheet straddles the blade, the sheet is held in alignment with the blade, and a slot of any desired length may be cut by continuing this operation.

In accordance with the patent statutes, I have described the principles of construction and operation of my improvement in hand slotter, and while I have endeavored to set forth the best embodiment thereof, I desire to have it understood that changes may be made within the scope of the following claim without departing from the spirit of my invention.

I claim:

A slot cutter for use in cutting a slot in an edge of a sheet of corrugated paperboard and the like, the cutter including:
- a table having means defining an elongated rectangular slot terminating in spaced relation to the edges of the table,
- the longitudinal edges of said slot being parallel and spaced apart a uniform distance,
- a cutting blade having a cutting end and an anchoring end and having a body of substantially uniform thickness to fit snugly between the longitudinal edges of said slot,
- said anchoring end extending through said slot near one end thereof,
- pivot means having an axis normal to said blade body and parallel to the surface of said table secured to said table below said slot,
- said cutting end of said cutting blade including a cutting edge pivotal from a position spaced above the surface of said table to a position extending through said slot,
- said cutting edge terminating in closely spaced relation to the other end of said slot,
- said anchoring end of said cutting blade being adapted to serve as a guide for forming a slot longer than the length of said cutting edge by engaging the sides of a previously formed slot in the paperboard to hold the cutting blade aligned with the previously formed slot,
- a handle of material thicker than said blade secured to the upper edge of said blade and spaced above said table at all times, and
- shoulder means on the anchoring end of said blade and engageable with the under surface of said table beyond said slot to limit pivotal movement of said blade.

References Cited by the Examiner

UNITED STATES PATENTS

| 287,249 | 10/83 | Crane | 83—599 |
|---|---|---|---|
| 1,666,316 | 4/28 | Sparks | 83—608 |
| 1,805,399 | 5/31 | Hendrick | 83—607 |
| 1,918,104 | 7/33 | Hook | 83—607 |
| 2,372,699 | 4/45 | Wiken et al. | 83—544 |
| 2,372,784 | 4/45 | Jansen et al. | 83—579 X |
| 2,660,241 | 11/53 | Junkunc | 83—602 X |
| 2,789,642 | 4/57 | Schwork | 83—608 |
| 2,999,410 | 9/62 | Brenner | 83—609 |

FOREIGN PATENTS

| 599,004 | 3/48 | Great Britain. |
|---|---|---|

ANDREW R. JUHASZ, *Primary Examiner.*

DONALD R. SCHRAN, CARL W. TOMLIN, *Examiners.*